Aug. 31, 1943.   D. P. SMITH   2,328,504
CONVEYER FOR INDUSTRIAL WASHING AND DRYING MACHINES
Filed Nov. 22, 1940   3 Sheets-Sheet 1

INVENTOR.
Donald P. Smith
BY Olivia B. Waiser
ATTORNEY.

Aug. 31, 1943.                D. P. SMITH                   2,328,504
              CONVEYER FOR INDUSTRIAL WASHING AND DRYING MACHINES
                         Filed Nov. 22, 1940            3 Sheets-Sheet 2

INVENTOR.
Donald P. Smith
BY Olive B. Kaiser
ATTORNEY.

Aug. 31, 1943.    D. P. SMITH    2,328,504
CONVEYER FOR INDUSTRIAL WASHING AND DRYING MACHINES
Filed Nov. 22, 1940    3 Sheets-Sheet 3
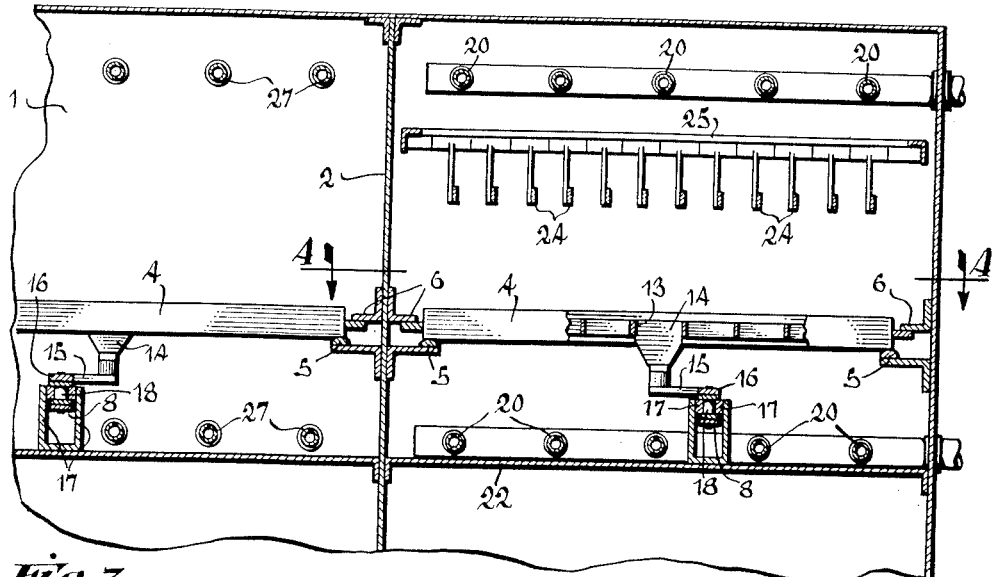
Fig. 3
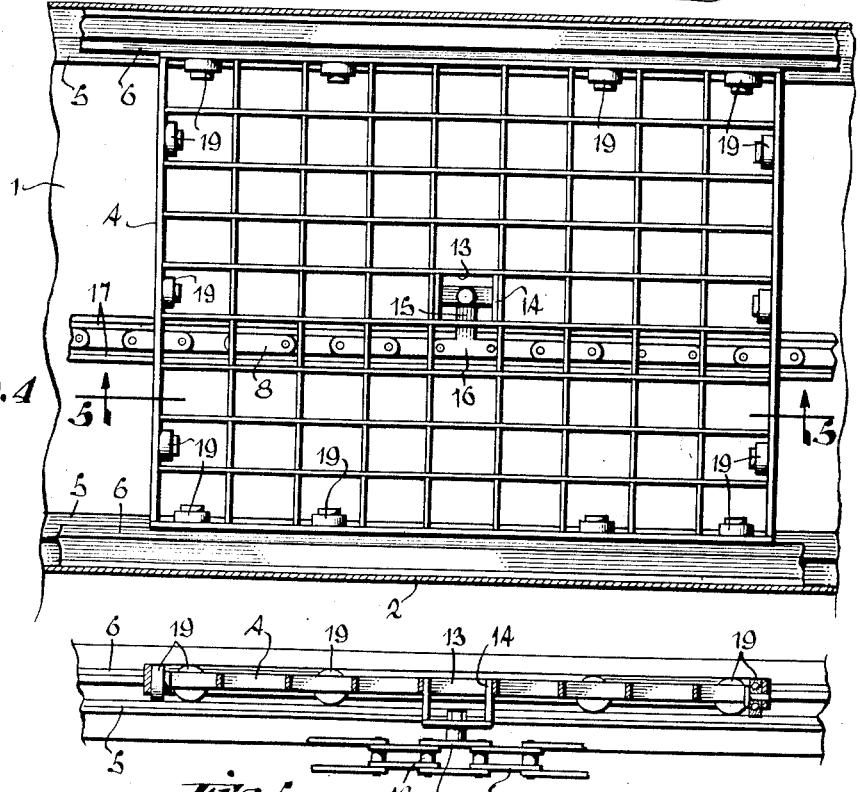
Fig. 4
Fig. 5
INVENTOR.
Donald P. Smith
BY Oliver B. Kaiser
ATTORNEY.

Patented Aug. 31, 1943

2,328,504

UNITED STATES PATENT OFFICE 2,328,504

CONVEYER FOR INDUSTRIAL WASHING AND DRYING MACHINES

Donald P. Smith, Norwood, Ohio, assignor to The Alvey-Ferguson Company, Cincinnati, Ohio, a corporation of Ohio Application November 22, 1940, Serial No. 366,561

2 Claims. (Cl. 198—19)

This invention relates to improvements in industrial washing and drying machines, primarily intended and adapted for washing and drying pans and similar articles used in bakeries, although not limited to such articles.

The principal object of the invention is to provide a combined washing and drying machine for continuous operation, to handle an exceedingly large volume, and compact in size to effect a considerable economy of space, and with the loading and unloading at one and the same end or station for a single operator service.

The articles are disposed upon trays of grid form, transported by an endless chain or conveyer, the trays with the conveyer moving in a horizontal rectangular course or circuit to return the trays to the point of entry, utilizing one or the forward direction of the circuit of travel for washing and the return for rinsing and drying. The forward and return runs are disposed side by side, or adjacently intermediately separated by a partition or wall in the casing to provide extreme compactness, a reduction in the cost of construction, and economy in operation. The trays are of a size, each to hold a large number of pans, pivotally connected with the chain. The chain can move about an arc without conveying the trays, the trays constantly moving in rectilinear lines. The improvement provides for a slight dwell or pause in the travel of the trays at the loading and unloading station, of material benefit in the application and withdrawal of the articles as well as avoiding any turning of the trays during an arc of travel of the chain for the return loop.

Therefore, another object of the invention is to provide an industrial washing and drying machine having the articles to be treated supported upon trays for a more commodious insertion and withdrawal thereof to and from the machine, adapting a single operator to handle a large number of pans, facilitating the loading and unloading operation, and reducing the operating costs.

Another object is to slidingly sustain the trays within the casing of the machine and transport the same by a continuously moving endless chain, materially simplifying the method of conveyance and effecting a reduction in the construction and maintenance cost; and to move the chain and trays both in a horizontal rectangular circuit, adapting the forward and return runs of the chain to be active for transporting the trays and returning the trays to the point of entry, thereby materially reducing the over-all length of the machine.

Various other features and advantages of the invention will be more fully set forth in a description of the accompanying drawings, in which:

Figure 3 is a section on line 3—3, Figure 2.

Figure 4 is a section on line 4—4, Figure 3.

Figure 1:
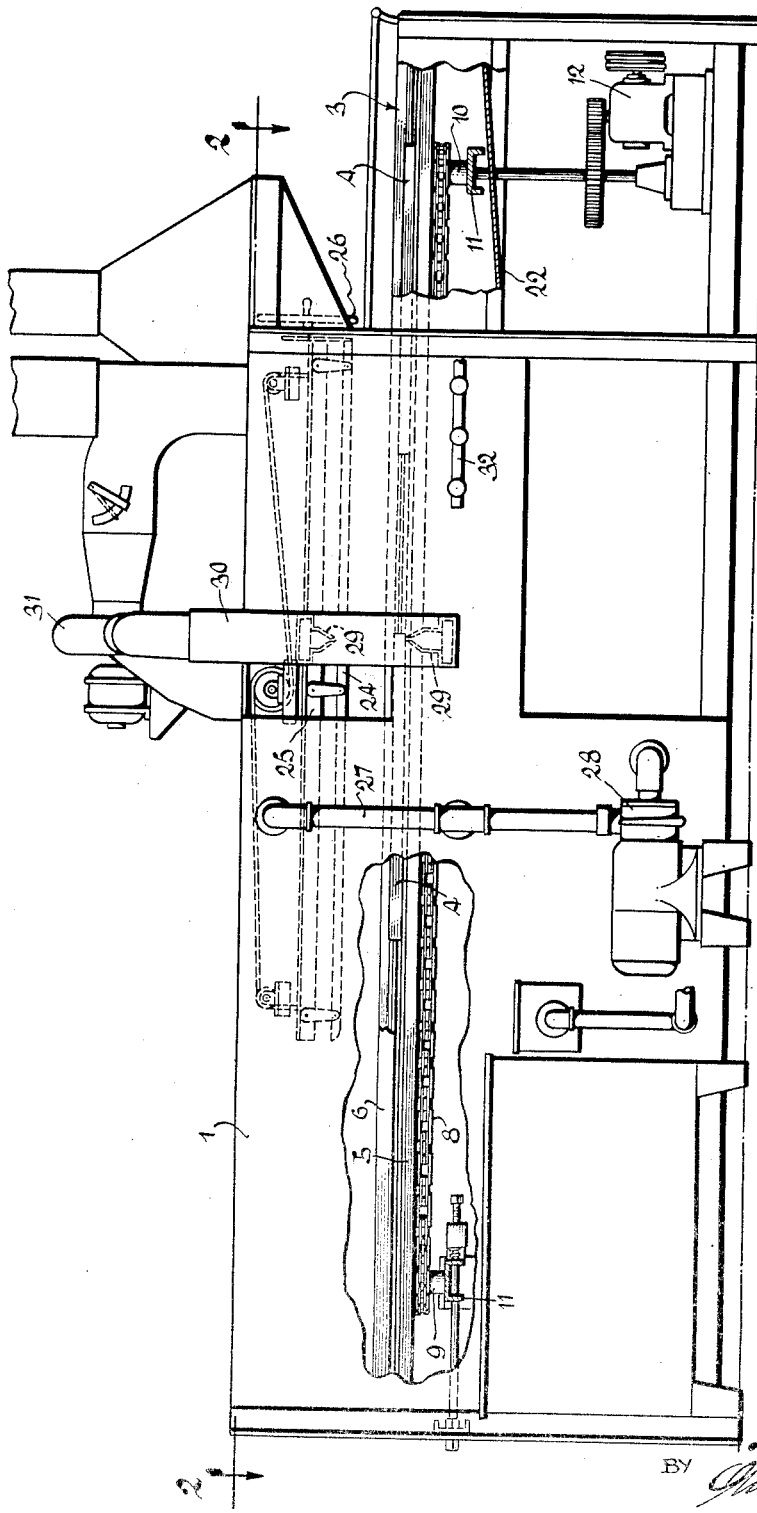
Figure 1 is a side elevation of the improved machine with a portion thereof broken away to expose certain internal parts or portions thereof.

Fgure 5 is a section on line 5—5, Figure 4.

Figure 6 is a detail top plan view of the medial portion of a tray, illustrating its connection with the conveyer chain as traveling about an idler or driving sprocket, at which point the chain moves in an arc, and for which period the tray travel is at rest, the tray always moving in a rectilinear direction to avoid travel in an arc.

The machine embodying the invention has a main enclosure or casing 1 interiorly subdivided by a central longitudinal partition or wall 2 to provide adjacently disposed chambers or compartments through which the articles for treatment are transported. The casing is generally rectangular in transverse section, and has an entrance and exit opening at one end. The casing in this respect differs from the conventional washing and drying machine, wherein the compartments or chambers are in tandem or in continuity rectilinearly, giving considerable and excessive length to the machine and conveyer with the return run of the conveyer idling. The entrance and exit openings are in opposite end walls requiring an operator for each end when the pans or articles are deposited directly upon the conveyers, and a special and expensive type of conveyer is required.

The casing construction of the present invention may consist chiefly of structural steel and sheet metal parts to provide the enclosure and partition walls and supports for the various parts and mechanism employed. The casing is equipped with an open extension 3 at one end for loading and unloading. The casing fabrication forming no part of the present invention, no specific description thereof will be made herein, except that which may be essential for a clear understanding thereof and necessary to the functioning of the machine, and this may also apply to the various mechanisms employed for the washing, rinsing, drying or other treatments effected at successive stages or zones in the transporting course of the articles within the machine.

The principal characteristics of the casing or housing is that it is interiorly subdivided longitudinally to provide adjoining compartments in communication at one end for continuity, and open at a corresponding opposite end for article entrance and exit into and from the compartment, so that the loading and unloading is at a common single end of the machine. While the articles are transferred in a rectangular circuitous course, the treatment or treatments may follow substantially the same and utilize the same mechanism as employed for a continuous linear course so as to pass through various zones for successive steps of operation, as for example, washing, rinsing, and drying.

In the cleansing of bakery tins or pans, the washing and cleansing is preferably performed by sprays of liquid having a high coefficient of turbulence and powerful stripping action directed from adjustable nozzles upon the moving and advancing articles from various directions and angles to insure flooding of the corners and crevices of the articles. Successful cleansing results largely depend upon the proper solution, proper volume, and proper pressure of sprays. In the present instance, the pans are disposed upon grids or trays in an inverted position, and subjected to the action of sprays from the top and bottom thereof. The sprays directed against the inverted or lower side of the pan are more powerful than from those directed from above and tend to dispel or lift the pans from the trays, therefore means are employed for holding the pans to the trays as they are transported through the cleansing and rinsing zones.

The spray solution, following a conventional practice, is pumped through the spray nozzles from a reservoir supply within the casing and into which it is drained for reuse. The solution from the sprayer is drained into a screen or sediment collecting compartment stationed to be accessible from the exterior of the machine but leading back into the reservoir. The articles, after they have been treated with a wash spray, generally are successively subjected or treated to a rinsing spray. The operation and apparatus employed is usually a duplicate of that employed for washing, and for the washing stage or period, likewise the pans are held to the trays against displacement. Following the rinsing stage or period, the articles in their continued travel pass through a heating stage for drying. Initially upon entering into the heating zone, the article is subjected to opposing hot air blasts, and for which period the articles are also held to the trays, whereupon they continue in their course, passing through a drying zone through which heated air is moved.

The casing with its central partition provides a forward and a return course, which join at one end within the casing and at the opposite end exterior of the casing; and according to the arrangement shown, the forward course within the casing is utilized for washing and the return for rinsing and drying, while the intermediate or connecting end of the forward and return courses for a draining period between washing and rinsing operations.

Figure 2:
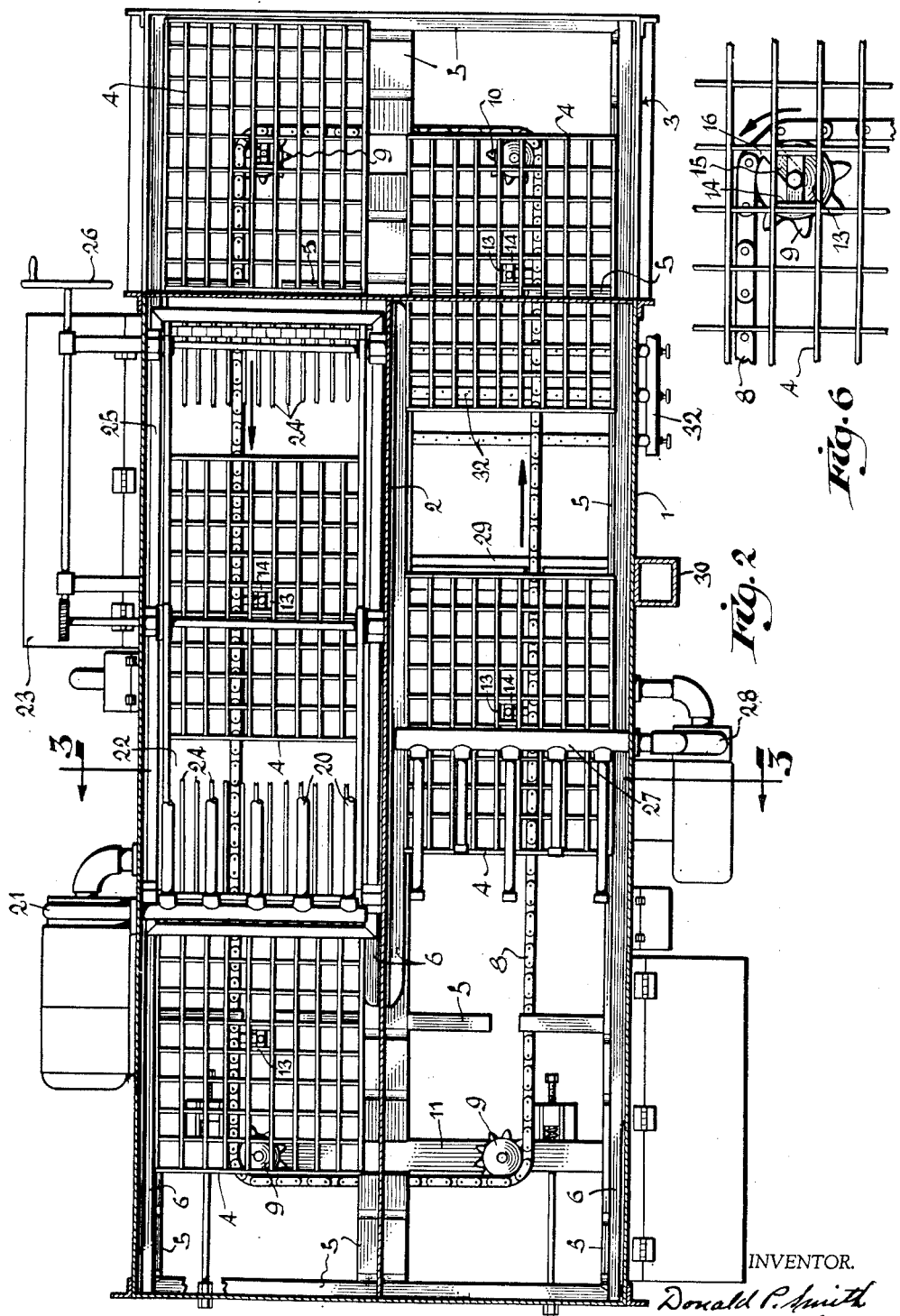
Figure 2 is a section on line 2—2, Figure 1.

The grid trays 4 constitute rectangular gratings of comparatively light weight, each for supporting a substantial number of pans and may be of lattice or other type of open framework which will not seriously impede or interfere with the upwardly directed sprays discharged from nozzles located beneath the travel plane of trays. As shown in Figure 2 of the drawings, the machine is illustrated as accommodating five trays for the circuit appropriately spaced apart as required, to permit the transferring and traverse from one run or course to the other without interference. The number, however, is selected apparopriate for the type of articles to be cleansed or treated.

The trays in their travel through the casing are supported at opposite sides or ends upon rails 5 in the form of half oval iron bars fixed to the casing and partitioned walls, as illustrated in Figure 3. The trays are confined against horizontal displacement within the casing by guide or guard rails 6 superposed above the rails 5, engaging relatively opposite sides of the trays and fixed to the casing and partitioned walls similar to the rails 5.

The trays are conveyed or transported by an endless sprocket chain 8 located beneath the track plane and engaged about and carried by a series of idler sprocket wheels 9, and the driven sprocket wheel 10 appropriately located for the rectangular circuit. Each sprocket wheel is carried by a shaft suitably journalled in a bearing mounted upon a cross bar or beam 11 shown as of channel form, which may constitute a part of the framing of the casing.

The driving sprocket wheel may be in transmission connection with any suitable power source, and as shown in Figure 1, the shaft for the driving sprocket wheel 10 connects with transmission gearing driven by a speed reducer 12 mounted beneath the loading and unloading extension 3 of the casing. The cross bar 11 for supporting the idlers 9 located at the inner or rear end of the runs is adjustably and yieldingly mounted upon the opposite side walls of the casing for regulating and maintaining the driving tension of the chain.

The trays are coupled to the conveyer chain in a manner which will allow them to idle or rest at the curves or bends in the chain circuit, the coupling moving in an arc about the axis of a sprocket wheel which establishes the curve in the chain circuit to avoid moving the trays in an arc correspondingly with the chain, the trays at all times moving in a rectilinear path. This action provides several advantages, as simplifying the casing and track construction, compactness, convenience in loading and unloading, a time allowance for replacement of the pans, with no change in the relative position of the trays, ingoing from outgoing.

The chain coupling connects or engages with a central interstice 13 in the tray, and in the present instance comprises a yoke-shaped clip 14 of the width of the central tray opening 13 and bounds opposite sides to establish a frame union therewith. The clip is pivotally connected to an arm 15 extending laterally from a link 16 of the chain. The pivotal connection of the clip to the link is coaxial with the axis of the idler or driving sprocket wheels 9, 10, when in registry therewith to allow the chain to move in an arc about the wheel or the bend in the circuit without imparting any transmitting motion to the tray. The tray, therefore, always moves in a rectilinear direction. The rectilinear traverse permits the alternate direction of courses to be relatively and immediately adjacently disposed, and the transfer of the trays from one course to another is accomplished within a minimum space without interference.

In the cleansing of some articles, as for instance bread pans and the like, particularly when a plurality thereof are grouped into a unit, it is more expeditious to individually deposit and remove the units from the trays in loading and unloading, although in some instances it may be more desirable to remove the trays with the articles deposited thereon. The method of handling the pans is optional. As the loading and unloading is at one of the corresponding ends of the machine, it is possible to inspect the pans when the trays remain intact within the machine, and if any are found, as by reason of carrying a heavier soil, not to be satisfactorily cleaned in a single circuit treatment, they may be permitted to remain upon the trays for successive treatment.

It is therefore possible to permit the articles to remain on the trays for a repeat in the cleaning cycle, which, however, can not be accomplished in the linear type of machines as they must be removed or are discharged from the conveyor at the outlet end as the conveyor idles in its return run, and therefore for any repeat the articles must be returned exterior of the machine and redeposited upon the conveyor at the loading end.

To stabilize the travel of the chain 8, the chain travels within a channel or between opposing guide rails 17 rigidly mounted upon a cross framing of the casing. The rails are of a width to engage the rollers 18 of the chain for vertical support as well as for horizontal stabilization. As shown in Figure 4, the trays each at the opposite ends and sides may be equipped with a series of anti-friction rollers 19 for riding upon the rails 5 to reduce friction. The number and spacing of the rollers is such as to furnish adequate support for a tray when some of the rollers are moving across a break in the rails at the corners of the casing made necessary to clear the tray coupling connection with the chain.

The process for cleansing bake pans follows substantially that employed for other types of machines, and forming no part of the present invention will be only briefly described, and may be altered to meet the various requirements. As a tray loaded with pans advances into and within the forward course of the circuit, and for an appropriate washing zone or period, the pans are subjected to a heavy volume high pressure spray of a heated liquid solution delivered through suitable nozzles respectively positioned above or below the pans.

The washing solution is supplied to the nozzles under pressure by pipes 20 through the medium of an electric motor driven centrifugal pump 21 located exterior of the casing. The pump takes its supply from the reservoir within the casing below the plane of the conveyer. The solution from the sprayer nozzles drops upon a platform as a bottom 22 for the washing compartment and thereby drains into a straining or screening tank 23 located exterior of the main casing; and from the screening tank the solution is conducted into the reservoir for re-heating and re-use.

The pans are disposed upon a tray in an inverted position to shed the washing and rinsing liquid. The force of the lower spray tends to lift the pans off of the trays, and therefore they are confined against displacement by a plurality of suitably spaced grid bars 24 extending longitudinally of the washing division or compartment and dependingly from a frame 25 adjustably sustained for regulating the elevation of the guide bars. The adjustment is accomplished through suitable mechanism operated by a hand wheel 26 accessible to the operator from the loading end of the machine. The trays each as they respectively reach the end of the forward course of travel advance with the chain in a lateral direction for transfer into the return course.

Each tray as it reaches an end of a course is in square with the end of the casing and at rest during the period that the coupling connecting the tray to the chain moves in an arc about a sprocket wheel; whereupon, the tray continues its travel with the chain in a lateral direction until it is moved in registry with the entrance for the return course.

In the return course, the pans advance through a rinsing zone, wherein they are subjected from above and below to rinsing sprays of water delivered through the pipe 27 connecting with an electric motor driven pump 28 located exterior of the casing taking its supply from a tank located within the casing below the plane of the conveyer similarly as for the washing liquid heretofore referred to.

As the pans continue in their return course, they are next subjected to a hot air spray delivered from opposing nozzles 29 connecting with a conduit 30 and an electric motor driven blower 31 mounted upon the top of the casing having its intake in connection with the rear end of the drying chamber or zone. The air within the drying zone is heated by suitable heater appliances, as gas burners 32. The heated air is circulated through the drying zone in a direction corresponding to the direction of the moving pans resulting from the hot air sprayers discharging into the drying zone at one end thereof and the blower intake connecting at an opposite or rear end of the drying zone.

While the invention has been exemplified for cleansing bakery pans, it is obvious that the machine is susceptible for washing or treating many other products. The washing treatment solutions differ for various types of work and are of a character to meet the particular requirements, different problems requiring different solutions. This also follows for the number and kind of treatment and the order of administration.

The trays in moving from the rear end of the return course to the forward or entrance end of the forward course follow substantially as previously described for the opposite end excepting that this transfer is exterior of the casing for loading and unloading. As illustrated in Figure 2, the machine discloses five trays at uniform spacing apart and to a degree for the opposite ends of the courses to prevent any interference between successive trays in their rectilinear transfer from one course to the second. The number of trays is optional, depending upon their size or area measurement and overall length of machine.

Having described my invention, I claim:

1. In a machine of the nature disclosed, a continuously traversing endless conveyer moving in a rectangular circuit to provide for alternate direction of travel within a casing and with one end thereof accessibly exposed at one end of the casing, wheels cooperating with the conveyer at the corners of the circuit, a plurality of foraminous trays of rectangular outline transportably sustained and in a spaced consecutive order translated by said conveyer, the spacing permitting each tray to dwell at the corners of the circuit and move laterally from the end of one division of the circuit and into a second division to clear and avoid interference to the continued movement of a succeeding tray, track means for transportably sustaining the trays and limiting their travel at the end of each division of the circuit, and a link for each tray fixed to the conveyer and pivotally connected to the tray, the link having a radius equal to that of the wheels cooperating with the conveyer with its pivotal connection with the tray coaxial therewith when the advancing movement of the tray is limited by the track at the end of a circuit division for providing an idle arc of link travel and non-translating dwell for the tray, prior to its lateral advance from one circuit division onto a second.

2. In a machine of the nature disclosed, a continuously traversing endless conveyer, wheels cooperating with the conveyer at diverging points in its circuit, a plurality of foraminous trays of rectangular outline, transportably sustained in spaced consecutive order translated by said conveyer, the spacing permitting each tray to dwell at a diverging point to clear and avoid interference to the continued movement of a succeeding tray, track means for transportably sustaining the trays and limiting their travel at a diverging point of the circuit, and a link for each tray fixed to the conveyer and pivotally connected to the tray, the link having a radius equal to that of the wheels cooperating with the conveyer, with its pivotal connection with the tray coaxial therewith when the advancing movement of the tray is limited by the track at a diverging point in the circuit for providing an idle arc of link travel and non-translating dwell for the tray for loading and unloading prior to its advance from a diverging point in the circuit.

DONALD P. SMITH.